US009603113B2

(12) United States Patent
Abedini et al.

(10) Patent No.: US 9,603,113 B2
(45) Date of Patent: Mar. 21, 2017

(54) DISTRIBUTED ALGORITHM FOR CONSTRUCTING AND MAINTAINING A HIERARCHICAL STRUCTURE FOR DEVICE-TO-DEVICE SYNCHRONIZATION

(71) Applicant: QUALCOMM Incorporated, San Diego, CA (US)

(72) Inventors: Navid Abedini, Raritan, NJ (US); Nilesh Nilkanth Khude, Bridgewater, NJ (US); Saurabha Rangrao Tavildar, Jersey City, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 14/066,641

(22) Filed: Oct. 29, 2013

(65) Prior Publication Data
US 2015/0117437 A1 Apr. 30, 2015

(51) Int. Cl.
*H04L 12/56* (2006.01)
*H04L 12/26* (2006.01)
*H04L 12/24* (2006.01)
*H04L 12/28* (2006.01)
*G06F 1/16* (2006.01)
*G06F 15/16* (2006.01)
(Continued)

(52) U.S. Cl.
CPC ..... *H04W 56/0025* (2013.01); *H04W 56/002* (2013.01); *H04W 56/0015* (2013.01)

(58) Field of Classification Search
CPC ... H04W 84/18; H04W 56/00; H04W 56/001; H04W 56/002; H04W 56/0025; H04W 56/0015; H04W 36/0055; H04W 88/04; H04J 3/0635; H04J 3/0679; H04J 3/0641; H04J 3/0647; H04J 3/0652; H04J 3/0676; H04J 3/0673; H04J 2011/0096
USPC ....... 370/350, 252, 503, 310, 328, 338, 324, 370/509; 455/502; 709/248, 223, 238, 709/228, 230; 375/354, 356, 355
See application file for complete search history.

(56) References Cited

U.S. PATENT DOCUMENTS 7,729,336 B2 6/2010 Pun et al.
8,374,163 B2 * 2/2013 Horn .................... H04J 3/0679
370/347
(Continued)

FOREIGN PATENT DOCUMENTS

WO 2013083197 A1 6/2013

OTHER PUBLICATIONS

International Search Report and Written Opinion—PCT/US2014/062363—ISA/EPO—Jan. 30, 2015.

*Primary Examiner* — Wutchung Chu
(74) *Attorney, Agent, or Firm* — Arent Fox LLP

(57) ABSTRACT

A method, an apparatus, and a computer program product for wireless communication are provided. The apparatus may be a UE. The UE determines timing information associated with a synchronization signal to be transmitted. The timing information includes a hop count and a reliability indicator associated with the synchronization signal. The reliability indicator is independent of the hop count and indicates one of reliable or unreliable. The UE broadcasts the timing information with the synchronization signal. The hop count may be a number of hops the synchronization signal is from a base station synchronization signal received from a base station.

20 Claims, 13 Drawing Sheets

(51) Int. Cl.
*G06F 15/173* (2006.01)
*H04W 56/00* (2009.01)

(56) References Cited

U.S. PATENT DOCUMENTS

| | | | | |
|---|---|---|---|---|
| 8,909,276 B2* | 12/2014 | Lim | H04W 76/023 | 370/252 |
| 8,909,279 B2* | 12/2014 | Yavuz et al. | | 455/522 |
| 9,137,766 B2* | 9/2015 | Abraham | H04W 56/001 | |
| 9,167,544 B2* | 10/2015 | Zheng | H04W 52/30 | |
| 2003/0037033 A1* | 2/2003 | Nyman et al. | | 707/1 |
| 2003/0185104 A1* | 10/2003 | Goergen | | 368/47 |
| 2005/0152379 A1* | 7/2005 | Hall | H04L 12/437 | 370/400 |
| 2006/0245440 A1* | 11/2006 | Mizukoshi | | 370/400 |
| 2007/0074036 A1* | 3/2007 | Ramzan | G06F 21/33 | 713/176 |
| 2007/0135115 A1* | 6/2007 | Sawada | H04B 7/269 | 455/422.1 |
| 2007/0171853 A1* | 7/2007 | Jones | H04B 7/269 | 370/328 |
| 2008/0019328 A1* | 1/2008 | Rudnick | H04J 4/00 | 370/337 |
| 2008/0144668 A1* | 6/2008 | Hall | H04J 3/0652 | 370/503 |
| 2008/0153493 A1* | 6/2008 | Salokannel | H04W 84/20 | 455/436 |
| 2008/0165761 A1* | 7/2008 | Goppner et al. | | 370/350 |
| 2008/0240073 A1* | 10/2008 | Pun et al. | | 370/350 |
| 2008/0240075 A1* | 10/2008 | Yamaji | H04J 3/0682 | 370/350 |
| 2009/0016229 A1* | 1/2009 | Wu | H04L 12/1881 | 370/252 |
| 2009/0122782 A1 | 5/2009 | Horn et al. | | |
| 2009/0131094 A1* | 5/2009 | Natsume | H04W 52/12 | 455/522 |
| 2009/0190572 A1* | 7/2009 | Chang | H04W 56/00 | 370/350 |
| 2009/0196277 A1* | 8/2009 | Horn et al. | | 370/350 |
| 2009/0262663 A1* | 10/2009 | Gosset | H04W 8/005 | 370/254 |
| 2009/0323565 A1* | 12/2009 | Funakubo | H04L 5/22 | 370/280 |
| 2010/0110929 A1* | 5/2010 | Li | H04B 1/7143 | 370/254 |
| 2010/0157885 A1* | 6/2010 | Koyanagi | H04W 36/30 | 370/328 |
| 2010/0202436 A1* | 8/2010 | Albert | H04J 3/0655 | 370/350 |
| 2010/0216479 A1* | 8/2010 | Kato | H04W 74/002 | 455/450 |
| 2011/0182280 A1 | 7/2011 | Charbit et al. | | |
| 2011/0222515 A1* | 9/2011 | Wang | H04W 84/20 | 370/338 |
| 2011/0237270 A1* | 9/2011 | Noh et al. | | 455/450 |
| 2011/0255429 A1* | 10/2011 | Carrera | H04W 24/06 | 370/252 |
| 2012/0002596 A1* | 1/2012 | Kim et al. | | 370/315 |
| 2012/0165014 A1* | 6/2012 | Ishihara | H04M 1/00 | 455/435.2 |
| 2012/0250629 A1 | 10/2012 | Mo et al. | | |
| 2012/0294245 A1* | 11/2012 | Chang | H04W 56/002 | 370/329 |
| 2012/0307698 A1 | 12/2012 | Tavildar et al. | | |
| 2013/0070751 A1 | 3/2013 | Atwal et al. | | |
| 2013/0128813 A1* | 5/2013 | Yang et al. | | 370/328 |
| 2015/0163760 A1* | 6/2015 | Wu | H04W 56/0015 | 370/336 |

\* cited by examiner

DISTRIBUTED ALGORITHM FOR CONSTRUCTING AND MAINTAINING A HIERARCHICAL STRUCTURE FOR DEVICE-TO-DEVICE SYNCHRONIZATION

BACKGROUND

Field

The present disclosure relates generally to communication systems, and more particularly, to a distributed algorithm for constructing and maintaining a hierarchical structure for device-to-device (D2D) synchronization.

Background

In a Long Term Evolution (LTE) network, evolved Node Bs (eNBs) broadcast synchronization signals (primary synchronization signals (PSS) and secondary synchronization signals (SSS)) in each cell every 5 ms. In a D2D network, each user equipment (UE) may broadcast synchronization signals at a much slower rate (e.g., once every second) in order to reduce energy consumption. Because UEs may synchronize based on synchronization signals from other UEs, methods and apparatuses are needed for improving D2D timing synchronization.

SUMMARY

In an aspect of the disclosure, a method, a computer program product, and an apparatus are provided. The apparatus may be a user equipment (UE). The UE determines timing information associated with a synchronization signal to be transmitted. The timing information includes a hop count and a reliability indicator associated with the synchronization signal. The reliability indicator is independent of the hop count and indicates one of reliable or unreliable. The UE broadcasts the timing information with the synchronization signal. The hop count may be a number of hops the synchronization signal is from a base station synchronization signal received from a base station.

DETAILED DESCRIPTION

Figure 1:
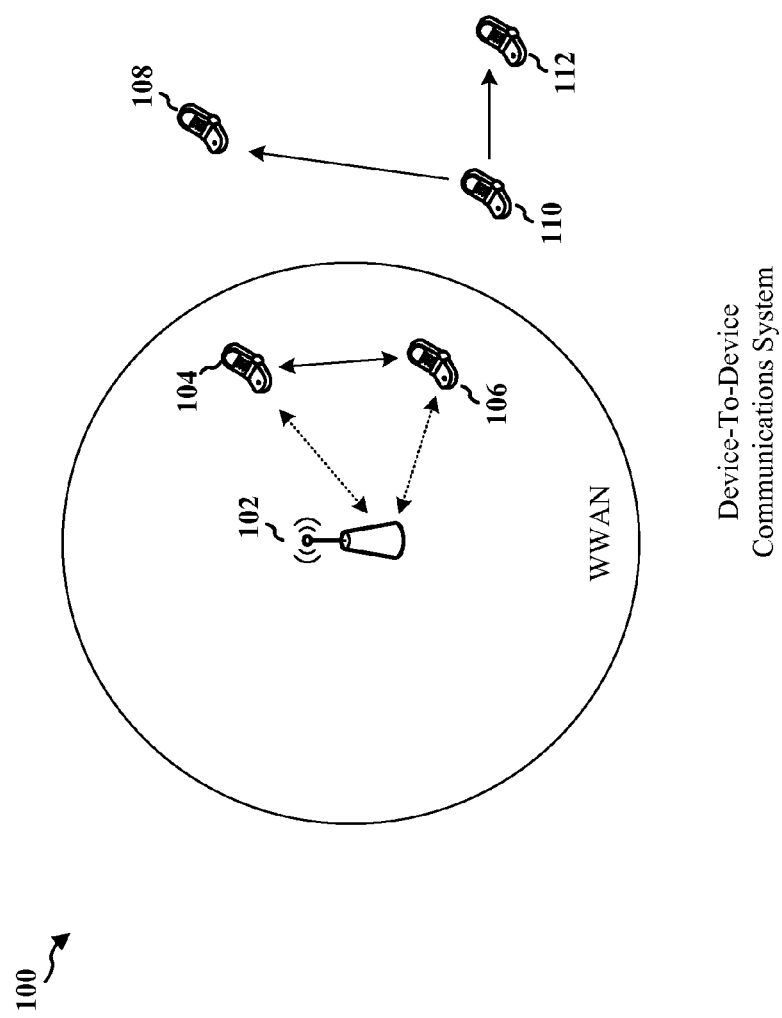
FIG. 1 is a diagram of a D2D communications system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatuses and methods. These apparatuses and methods will be described in the following detailed description and may be illustrated in the accompanying drawings by various blocks, modules, components, circuits, steps, processes, algorithms, elements, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The one or more processors may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk (CD) ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram 100 of a D2D communications system. The D2D (also referred to as peer-to-peer (P2P)) communications system includes a plurality of wireless devices 104, 106, 108, 110, 112. The D2D communications system may overlap with a cellular communications system, such as for example, a wireless wide area network (WWAN). Some of the wireless devices 104, 106, 108, 110, 112 may communicate together in D2D communication using the DL/UL WWAN spectrum, some may communicate with the base station 102, and some may do both. For example, as shown in FIG. 1, the wireless device 110 is broadcasting synchronization information to the wireless devices 108, 112 and the wireless devices 104, 106 are in D2D communication. The wireless devices 104, 106 may also communicate with the base station 102.

The base station 102 may also be referred to as a Node B, an evolved Node B (eNB), an access point, a base transceiver station, a radio base station, a radio transceiver, a transceiver function, a basic service set (BSS), an extended service set (ESS), or some other suitable terminology. Examples of wireless devices include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The wireless device may also be referred to by those skilled in the art as a UE, mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The exemplary methods and apparatuses discussed infra are applicable to any of a variety of wireless D2D communications systems, such as for example, a wireless D2D communication system based on FlashLinQ, WiMedia, Bluetooth, ZigBee, Wi-Fi based on the IEEE 802.11 standard, or Long Term Evolution (LTE). However, one of ordinary skill in the art would understand that the exemplary methods and apparatuses are applicable more generally to a variety of other wireless D2D communication systems.

In an LTE network, eNBs may broadcast synchronization signals (PSS/SSS) in each cell. In a D2D network, UEs may broadcast synchronization signals at a much slower rate in order to reduce energy consumption. In the D2D network, a more accurate time and frequency synchronization can be achieved if multiple UEs transmit the synchronization signals in different time-orthogonal resources. In the D2D network, a fraction of the UEs may be connected to a wireless wide area network (WWAN) (or Global Positioning System (GPS)) from which the UEs can achieve perfect timing. The external timing may used as a reference across the D2D network. However, the distances to the WWAN-connected UEs have an impact on the accuracy of tracking the external time and frequency. To improve the accuracy of the timing synchronization, in an exemplary algorithm, UEs may construct and maintain a hierarchical structure based on the number of hops to the closest WWAN-connected UE.

Specifically, in the exemplary algorithm, WWAN-connected UEs lie on the top of the hierarchy (i.e., level l=0). UEs with a minimum distance of l hops to a WWAN-connected UE belong to the $l^{th}$ level. UEs in level l≥1 keep track of timing information from neighbor UEs. In some cases, UEs with level l≥1 keep track of timing information only from neighbor UEs that belong to a lower level (i.e., a level l−1 or lower, with l=0 being the lowest level). UEs construct such a hierarchical structure through including a "hop count" to timing information sent along with a synchronization signal. The hop count of a UE is the lowest hop count of its neighbors plus one. UEs utilize additional algorithms to deal with the dynamics of the topology. For example, if a WWAN-connected UE loses WWAN connectivity, UEs utilize additional algorithms for the gradual transition of the UEs to the next closest WWAN-connected UE. To facilitate the additional algorithms, UEs explicitly propagate information regarding loss of connectivity. Specifically, UEs may include one additional bit with the timing information indicating whether a source is reliable or unreliable. UEs may use the reliability information to indicate the loss of connectivity and to avoid loops in the hop count. The exemplary algorithm is provided in more detail infra.

Figure 2:
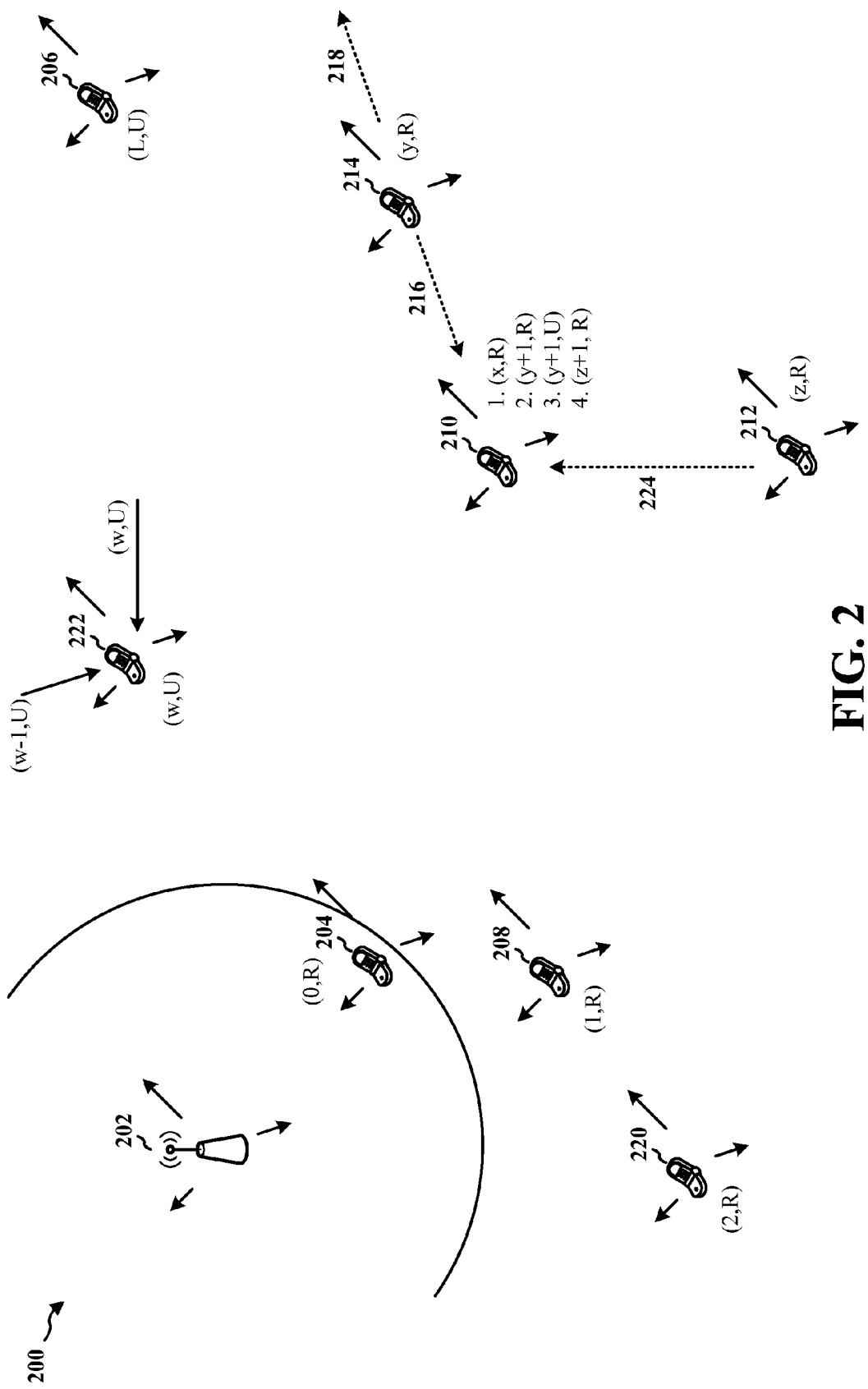
FIG. 2 is a diagram illustrating an exemplary method of a distributed algorithm for constructing and maintaining a hierarchical structure for D2D synchronization.

FIG. 2 is a diagram 200 illustrating an exemplary method of a distributed algorithm for constructing and maintaining a hierarchical structure for D2D synchronization. The following hop count algorithm constructs and maintains the hierarchical structure in response to network dynamics by requiring the UEs to update their (level, state) pairs based on (level, state) pairs (also referred to as timing information) received from their neighbors. Each UE broadcasts its level and state (l, s), where l ∈ {0, 1, . . . , L} and s∈{R, U}. L is the maximum number of hops to a WWAN-connected UE, and is chosen according to a network diameter. A UE can be in one of two possible states, reliable (s=R) or unreliable (s=U), based on the state of its detected neighbors. Each $UE_i$ updates its level and state pair to $(l_i, s_i)$.

At the time of power-up, if a $UE_i$ is connected to the WWAN, then the $UE_i$ sets its level and state pair to $(l_i, s_i) = (0, R)$. For example, upon power up the UE 204 is connected to the WWAN through the eNB 202. Accordingly, the UE 204 synchronizes based on the synchronization signal from the eNB 202 and sets its level and state pair to (0, R). The UE 204 subsequently broadcasts a synchronization signal with its timing information of (0, R). Upon power up, if a $UE_i$ does not detect any existing synchronization transmissions, the $UE_i$ sets its level and state pair to $(l_i, s_i) = (L, U)$. For example, upon power up the UE 206 does not detect any synchronization transmissions. Accordingly, the UE 206 sets its level and state pair to (L, U). The UE 206 subsequently broadcasts a synchronization signal with its timing information of (L, U). If upon power up the $UE_i$ detects other UEs that are reliable, the $UE_i$ sets $l_i = \min_{j:s_j=R} l_j + 1$, and $s_i = R$. For example, upon power up, the UE 208 may detect synchronization transmissions from the UEs 204, 220. The UE 204 reports a level and state pair of (0, R), while the UE 220 reports a level and state pair of (2, R). Accordingly, the UE 208 synchronizes based on the synchronization signal from the UE 204 and sets its level and state pair to (1, R) based on the timing information receiving from the UE 204. The UE 208 subsequently broadcasts a synchronization signal with its timing information of (1, R). If upon power up, a $UE_i$ detects only UEs that are unreliable, the $UE_i$ sets $l_i = \min(\min_j l_j + 1, L)$, and $s_i = U$. For example, assume that the UE 222 receives synchronization signals with timing information of (w−1, U) and (w, U) and no other synchronization signals. The UE 222 synchronizes based on the synchronization signal with the timing information (w−1, U), as the level w−1 is less than w, and sets its level and state pair to (w, U). The UE 222 subsequently broadcasts a synchronization signal with its timing information of (w, U).

For on-going reliable states, assume that $l_i=l$ for a $UE_i$. If the $UE_i$ detects any reliable neighbor $UE_j$ with $l_j \leq l-1$, then the $UE_i$ sets $l_i=\min_{j:s_j=R,\ l_j \leq l-1} l_j+1$, $s_i=R$. Otherwise, if the $UE_i$ does not detect any such neighbor $UE_j$ (i.e., $l_j \leq l-1$, and $s_j=R$) for T consecutive synchronization iterations, then the $UE_i$ sets its level and state pair to $(l_i, s_i)=(l, U)$. For example, assume that for the UE 210, its level $l=x$. Assume also that the UE 214 moves 216 within proximity of the UE 210. The UE 214 broadcasts a synchronization signal with timing information of $(y, R)$, where $y<x$. The UE 210 synchronizes based on the synchronization signal from the UE 214 and sets its level and state pair to $(y+1, R)$ based on the timing information received from the UE 214. The UE 210 subsequently broadcasts a synchronization signal with its timing information of $(y+1, R)$. However, if the UE 214 moves 218 out of proximity of the UE 210, the UE 210 will continue to broadcast its synchronization signal with its timing information of $(y+1, R)$ for T consecutive synchronization iterations. After T consecutive synchronization iterations, the UE 210 sets its level and state pair to $(y+1, U)$.

For on-going unreliable states, assume that a $UE_i$ changes its level and state pair from $(l_i, s_i)=(l, R)$ to a level and state pair of $(l, U)$ at the beginning of iteration k. Each iteration is an opportunity to broadcast a synchronization signal with the timing information. The $UE_i$ remains in the same state $(l, U)$ for the following iterations $k+\delta(\delta \geq 0)$, unless the $UE_i$ detects a reliable $UE_j$ with $l_j=l+\Delta$ after iteration $k+\delta$, where $\delta \geq \Delta T$. In this case, $UE_i$ sets $l_i=\min_{j:s_j=R,\ (l_j-l)T \leq \delta} l_j+1$, and $s_i=R$. This last step ensures that the loops in the hop count algorithm are avoided. Note that in the algorithm, the parameter T is the number of trials to detect the transmissions by a previously found UE, before declaring its departure from the neighborhood. For example, assume that the UE 212 moves 224 within proximity of the UE 210 with a state of $(y+1, U)$ and that the UE 212 is broadcasting a synchronization signal with timing information of $(z, R)$, where $z>y+1$ and $z-(y+1)=\Delta$. Because the synchronization signal from the UE 212 has a higher level than the timing information of the UE 210, the UE 210 waits $\delta$ iterations, where $\delta \geq \Delta T$, and then after the $\delta$ iterations, the UE 210 sets its level and state pair to $(z+1, R)$. For a more specific example, assume that $y=5$, $z=8$, and $T=4$. Then the UE 210 has timing information of $(6, U)$ and the UE 212 is broadcasting a synchronization signal with timing information of $(8, R)$. The value $\Delta=2$. Because the timing information from the UE 212 has a higher level (6) than the timing information from the UE 210 (8), the UE 210 waits $\delta \geq 2*4=8$ broadcast synchronization iterations, and then after the 8 iterations, the UE 210 sets its level and state pair to $(9, R)$.

Methods associated with the exemplary algorithm are provided in more detail infra. Methods with respect to the time of power-up are described in relation to FIGS. 3-7, methods with respect to on-going reliable states are described in relation to FIGS. 8, 9, and methods with respect to on-going unreliable states are described in relation to FIGS. 10, 11.

Figure 3:
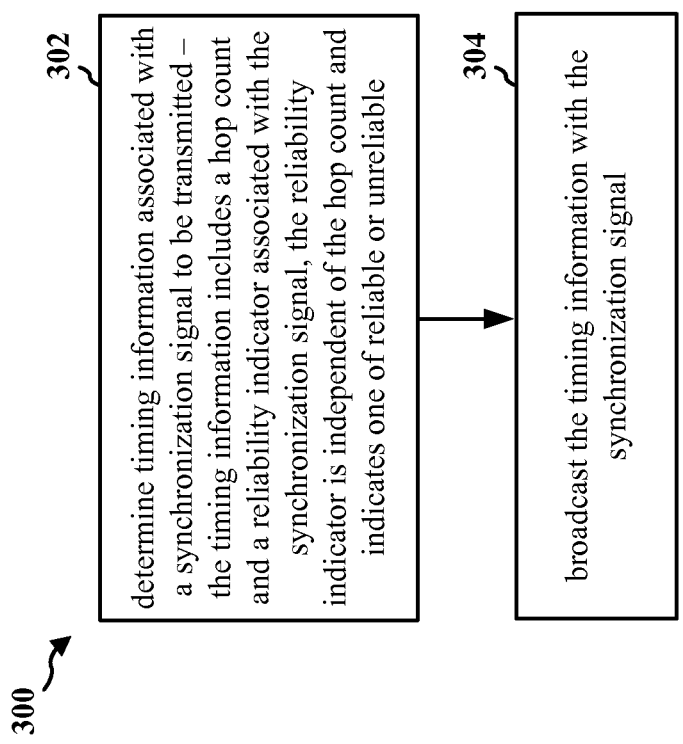
FIG. 3 is a flow chart of a first method of wireless communication.

FIG. 3 is a flow chart 300 of a first method of wireless communication. The method may be performed by a UE. In step 302, a UE determines timing information associated with a synchronization signal to be transmitted. The timing information includes a hop count and a reliability indicator associated with the synchronization signal. The reliability indicator is independent of the hop count and indicates one of reliable or unreliable. In step 304, the UE broadcasts the timing information with the synchronization signal. The hop count may be a number of hops the synchronization signal is from a base station synchronization signal received from a base station. For example, referring to FIG. 2, UEs determine timing information (l, s) associated with a synchronization signal to be transmitted. The timing information (l, s) includes a hop count l and a reliability indicator s associated with the synchronization signal. The reliability indicator s is independent of the hop count l and indicates one of reliable R or unreliable U. UEs subsequently broadcast the timing information (l, s) with the synchronization signal.

Figure 4:
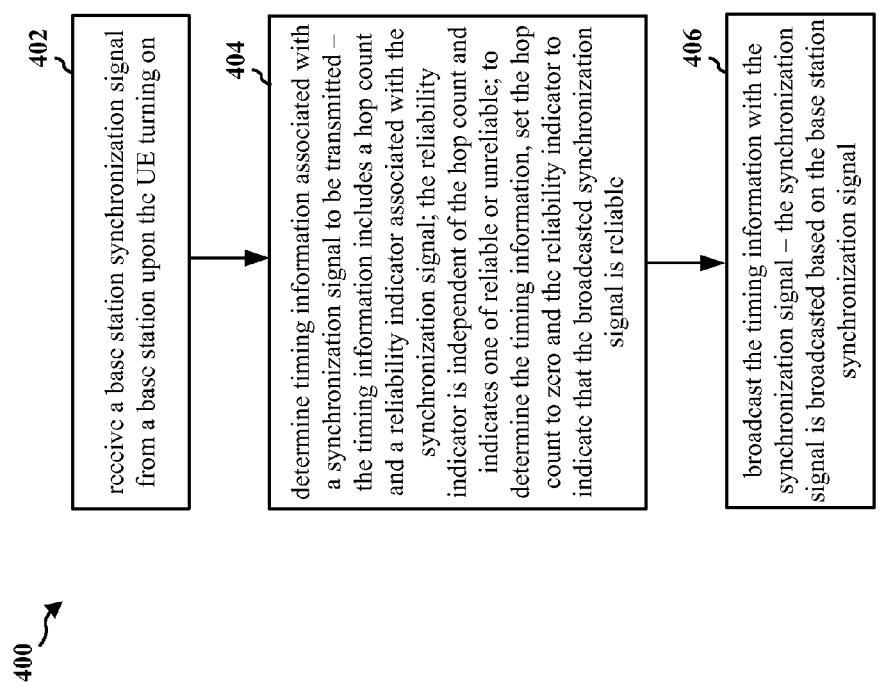
FIG. 4 is a flow chart of a second method of wireless communication.

FIG. 4 is a flow chart 400 of a second method of wireless communication. The method may be performed by a UE. In step 402, a UE may receive a base station synchronization signal from a base station upon the UE turning on. In step 404, the UE determines timing information associated with a synchronization signal to be transmitted. The timing information includes a hop count and a reliability indicator associated with the synchronization signal. The reliability indicator is independent of the hop count and indicates one of reliable or unreliable. The UE determines the timing information by setting the hop count to zero and the reliability indicator to indicate that the broadcasted synchronization signal is reliable. In step 406, the UE broadcasts the timing information with the synchronization signal. The synchronization signal is broadcasted based on the base station synchronization signal.

For example, referring to FIG. 2, the UE 204 receives a base station synchronization signal from the base station 202 upon the UE 204 turning on. The UE 204 determines timing information (l, s) associated with a synchronization signal to be transmitted. The timing information (l, s) includes a hop count l and a reliability indicator s associated with the synchronization signal. The reliability indicator s is independent of the hop count l and indicates one of reliable R or unreliable U. The UE determines the timing information by setting the hop count l to zero and the reliability indicator s to indicate that the broadcasted synchronization signal is reliable s=R. The UE 204 broadcasts the timing information (0, R) with the synchronization signal. The synchronization signal is broadcasted based on the base station synchronization signal.

Figure 5:
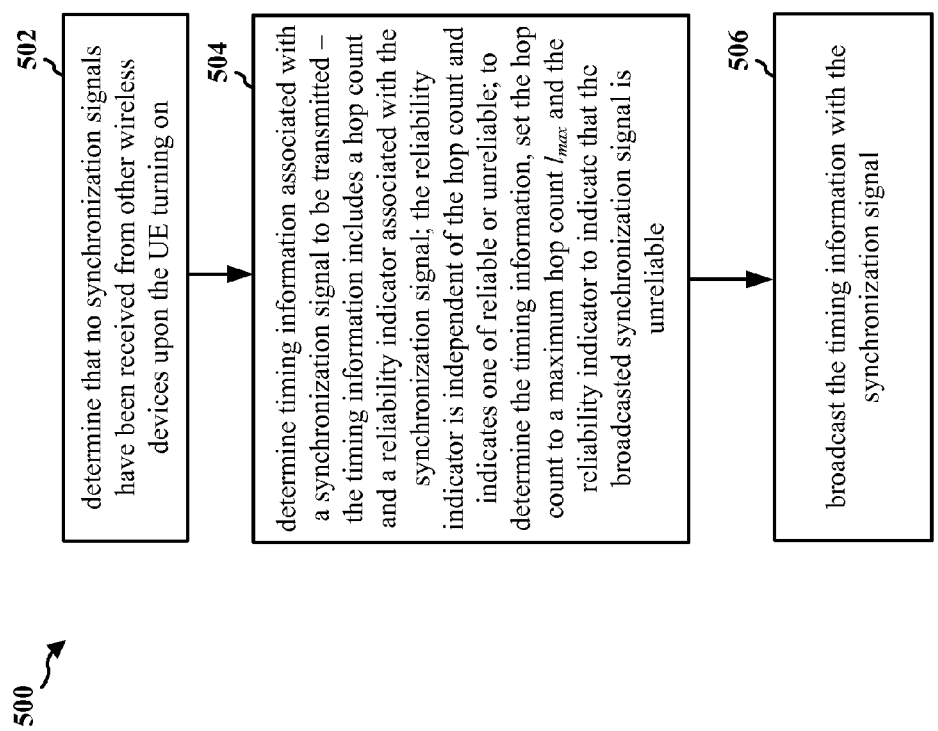
FIG. 5 is a flow chart of a third method of wireless communication.

FIG. 5 is a flow chart 500 of a third method of wireless communication. The method may be performed by a UE. In step 502, a UE determines that no synchronization signals have been received from other wireless devices (i.e., UEs or base stations) upon the UE turning on. In step 504, the UE determines timing information associated with a synchronization signal to be transmitted. The timing information includes a hop count and a reliability indicator associated with the synchronization signal. The reliability indicator is independent of the hop count and indicates one of reliable or unreliable. The UE determines the timing information by setting the hop count to a maximum hop count $l_{max}$ and the reliability indicator to indicate that the broadcasted synchronization signal is unreliable. In step 506, the UE broadcasts the timing information with the synchronization signal.

For example, referring to FIG. 2, the UE 206 determines that no synchronization signals have been received from other wireless devices (i.e., other UEs and base stations) upon the UE 206 turning on. The UE 206 determines timing information (l, s) associated with a synchronization signal to be transmitted. The timing information (l, s) includes a hop count l and a reliability indicator s associated with the synchronization signal. The reliability indicator s is independent of the hop count l and indicates one of reliable R or unreliable U. The UE 206 determines the timing information (l, s) by setting the hop count l to a maximum hop count $l_{max}$ (assume $L=l_{max}$) and the reliability indicator s to indicate that the broadcasted synchronization signal is unreliable s=U. The UE 206 broadcasts the timing information (L, U) with the synchronization signal.

Figure 6:
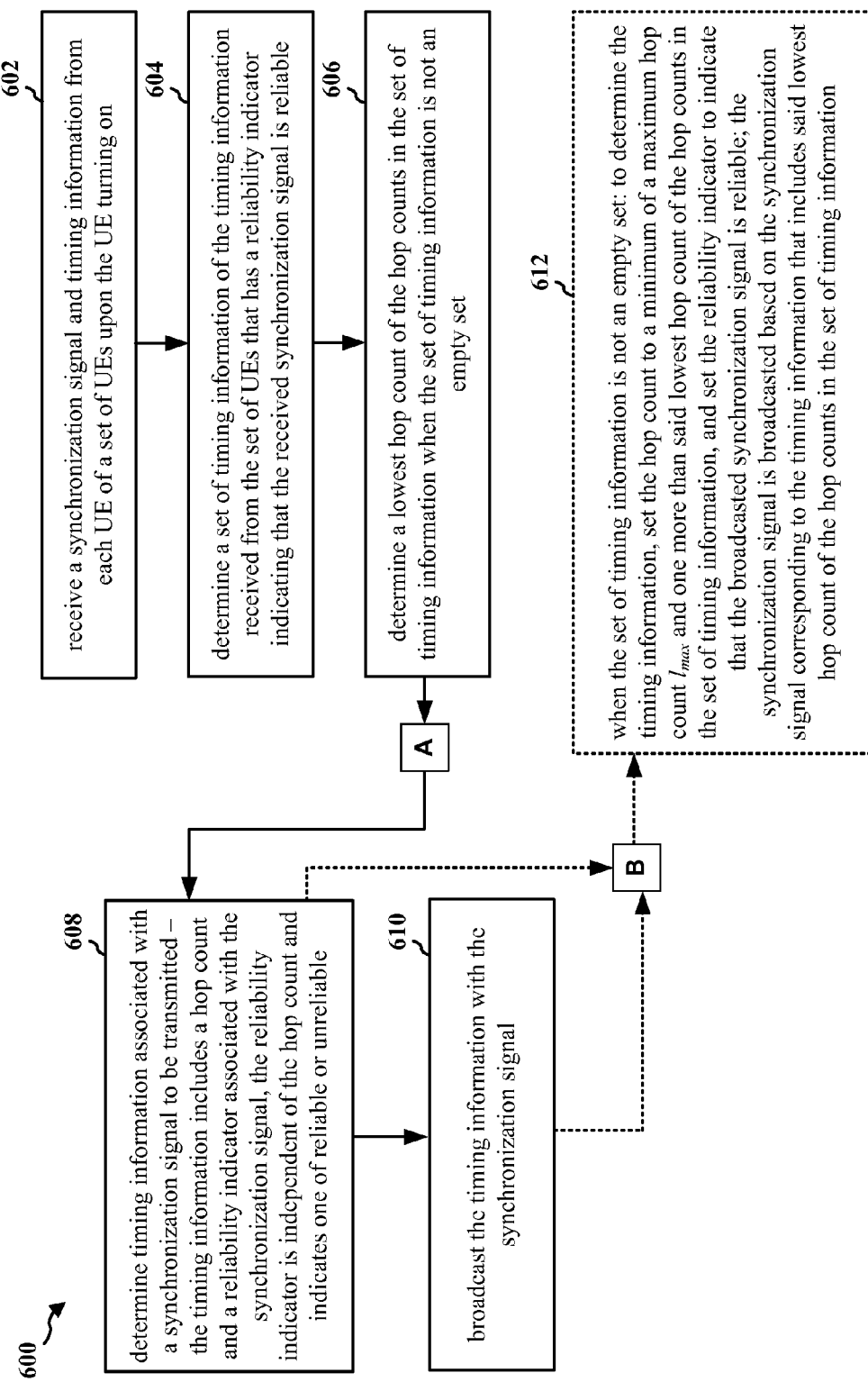
FIG. 6 is a flow chart of a fourth method of wireless communication.

FIG. 6 is a flow chart 600 of a fourth method of wireless communication. The method may be performed by a UE. In step 602, a UE receives a synchronization signal and timing information from each UE of a set of UEs upon the UE turning on. In step 604, the UE determines a set of timing information of the timing information received from the set of UEs that has a reliability indicator indicating that the received synchronization signal is reliable. In step 606, the UE determines a lowest hop count of the hop counts in the set of timing information when the set of timing information is not an empty set (i.e., the UE received timing information with at least one reliable state). After step 606, steps in A may be performed. After the steps in A, steps 608 and 610 are performed. In step 608, the UE determines timing information associated with a synchronization signal to be transmitted. The timing information includes a hop count and a reliability indicator associated with the synchronization signal. The reliability indicator is independent of the hop count and indicates one of reliable or unreliable. In step 610, the UE broadcasts the timing information with the synchronization signal. The steps 608, 610 may be performed by performing the steps in B, which include the steps in box 612. In box 612, when the set of timing information is not an empty set (i.e., the UE received timing information with at least one reliable state), the UE determines the timing information (in step 608) by setting the hop count to a minimum of a maximum hop count $l_{max}$ and one more than the lowest hop count of the hop counts in the set of timing information, and by setting the reliability indicator to indicate that the broadcasted synchronization signal is reliable. In addition, the synchronization signal is broadcasted (in step 610) based on the synchronization signal corresponding to the timing information that includes the lowest hop count of the hop counts in the set of timing information.

For example, referring to FIG. 2, the UE 208 receives a synchronization signal and timing information from each UE of a set of UEs 204, 220 upon the UE 208 turning on. The UE 208 determines a set of timing information (0, R), (2, R) of the timing information received from the set of UEs 204, 220 that has a reliability indicator indicating that the received synchronization signal is reliable. The UE 208 determines a lowest hop count of the hop counts in the set of timing information when the set of timing information is not an empty set (i.e., the UE 208 received timing information with at least one reliable state). The lowest hop count l=0. The UE 208 determines timing information (1, R) associated with a synchronization signal to be transmitted. The UE broadcasts the timing information (1, R) with the synchronization signal.

Figure 7:
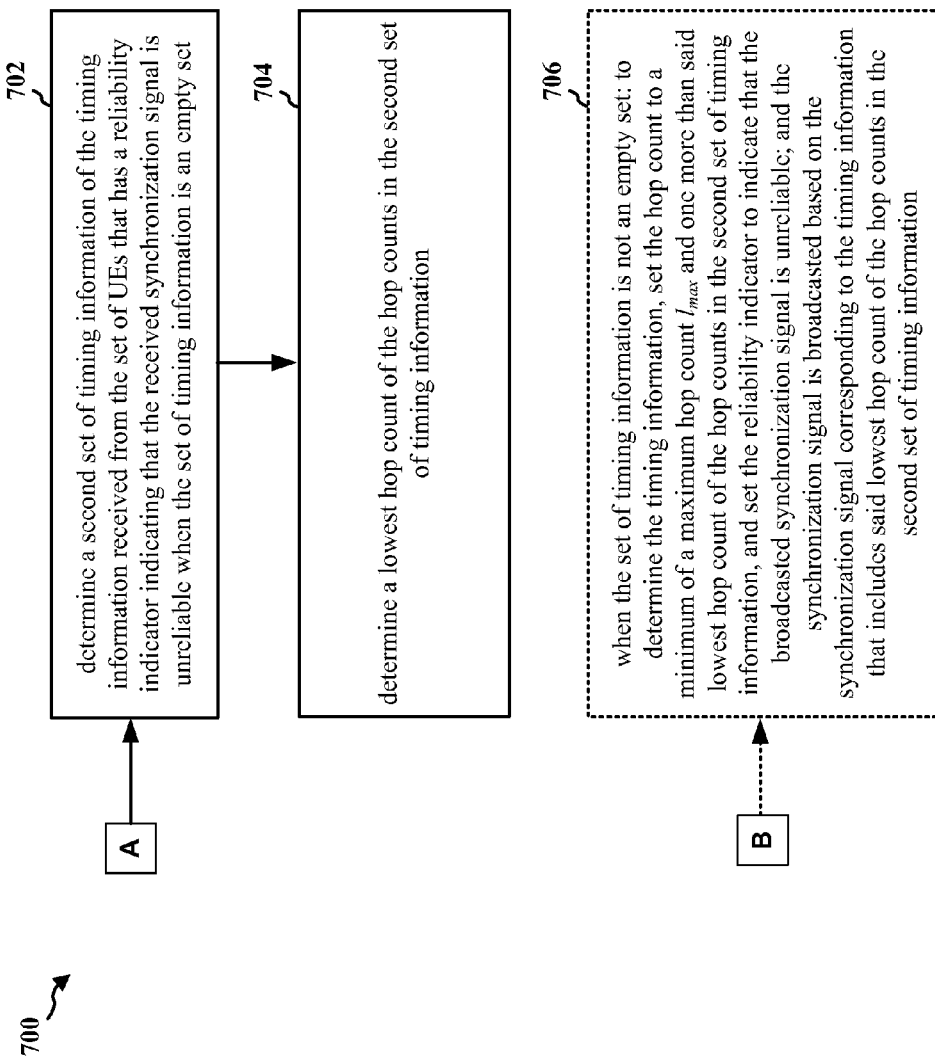
FIG. 7 is a flow chart of a fifth method of wireless communication.

FIG. 7 is a flow chart 700 of a fifth method of wireless communication. The method may be performed by a UE. The steps in A include the steps 702, 704. In step 702, the UE determines a second set of timing information of the timing information received from the set of UEs that has a reliability indicator indicating that the received synchronization signal is unreliable when the set of timing information is an empty set (i.e., the UE did not receive timing information with at least one reliable state). In step 704, the UE determines a lowest hop count of the hop counts in the second set of timing information. The steps 608, 610 may be performed by performing the steps in B, which include the step in box 706. In box 706, when the second set of timing information is not an empty set (i.e., the UE received timing information with at least one unreliable state), the UE determines the timing information (in step 608) by setting the hop count to a minimum of a maximum hop count $l_{max}$ and one more than the lowest hop count of the hop counts in the second set of timing information, and by setting the reliability indicator to indicate that the broadcasted synchronization signal is unreliable. The synchronization signal is broadcasted (in step 610) based on the synchronization signal corresponding to the timing information that includes the lowest hop count of the hop counts in the second set of timing information.

For example, referring to FIG. 2, the UE 222 determines a second set of timing information (w−1, U), (w, U) of the timing information received from the set of UEs that has a reliability indicator indicating that the received synchronization signal is unreliable when the set of timing information is an empty set (i.e., the UE 222 did not receive timing information with at least one reliable state). The UE determines a lowest hop count of the hop counts in the second set of timing information. The lowest hop count l=w. When the second set of timing information is not an empty set (i.e., the UE 222 received timing information with at least one unreliable state), the UE determines the timing information by setting the hop count to a minimum of a maximum hop count $l_{max}$ and one more than the lowest hop count of the hop counts in the second set of timing information, and by setting the reliability indicator to indicate that the broadcasted synchronization signal is unreliable. In this case, the UE 222 determines the timing information to be (w, U). The UE 222 broadcasts a synchronization signal with the timing information (w, U).

Figure 8:
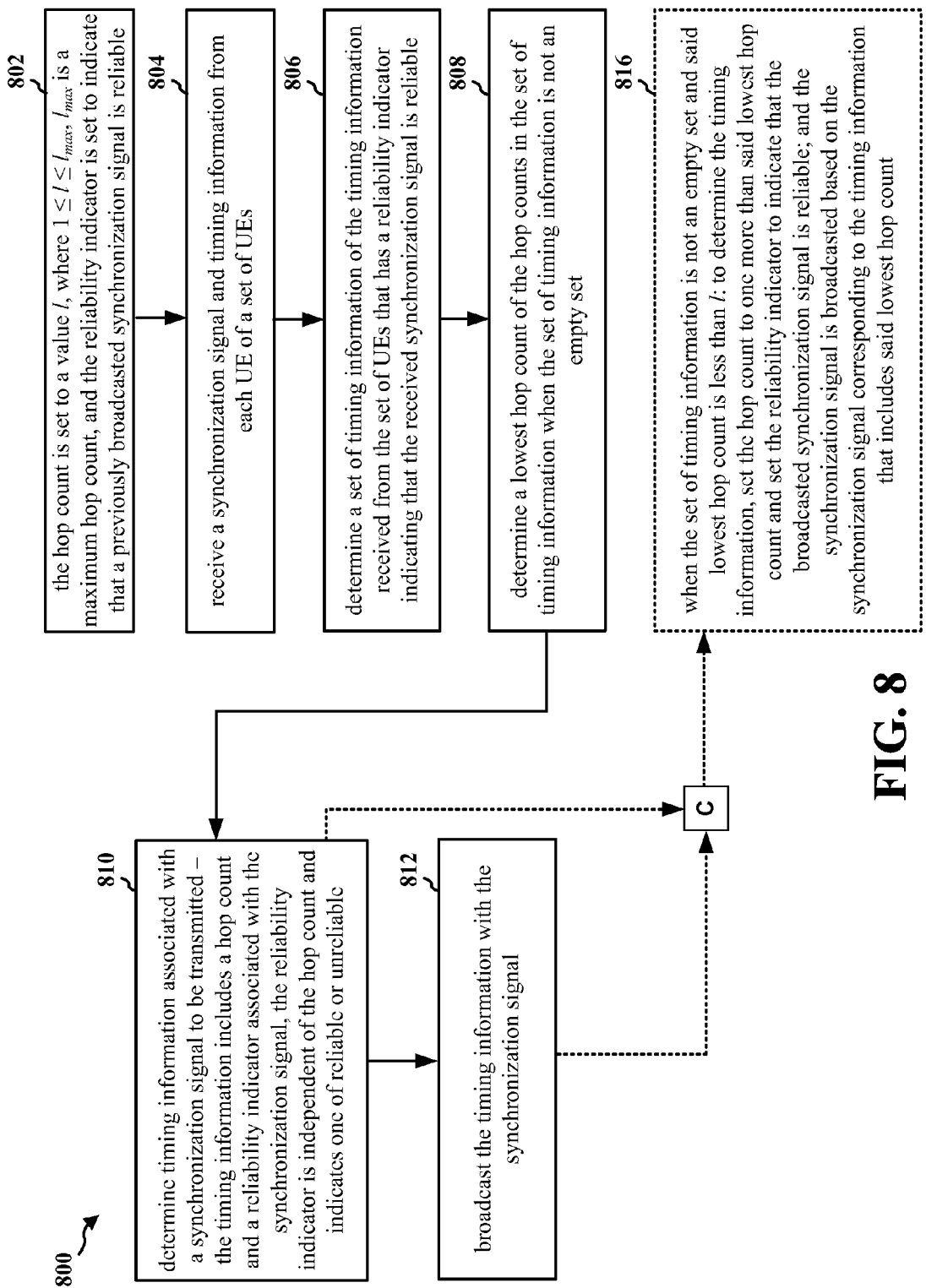
FIG. 8 is a flow chart of a sixth method of wireless communication.

FIG. 8 is a flow chart 800 of a sixth method of wireless communication. The method may be performed by a UE. In step 802, a UE sets the hop count to a value l, where $1 \leq l \leq l_{max}$, $l_{max}$ is a maximum hop count, and sets the reliability indicator to indicate that a previously broadcasted synchronization signal is reliable. In step 804, the UE receives a synchronization signal and timing information from each UE of a set of UEs. In step 806, the UE determines a set of timing information of the timing information received from the set of UEs that has a reliability indicator indicating that the received synchronization signal is reliable. In step 808, the UE determines a lowest hop count of the hop counts in the set of timing information when the set of timing information is not an empty set (i.e., the UE received timing information with at least one reliable state). In step 810, the UE determines timing information associated with a synchronization signal to be transmitted. The timing information includes a hop count and a reliability indicator associated with the synchronization signal. The reliability indicator is independent of the hop count and indicates one of reliable or unreliable. In step 812, the UE broadcasts the timing information with the synchronization signal. The steps 810, 812 may be performed by performing the steps in C, which include the step in box 816. In box 816, when the set of timing information is not an empty set (i.e., the UE received timing information with at least one reliable state) and the lowest hop count is less than l, the UE determines the timing information (in step 810) by setting the hop count to one more than the lowest hop count and by setting the reliability indicator to indicate that the broadcasted synchronization signal is reliable. The synchronization signal is broadcasted (in step 812) based on the synchronization signal corresponding to the timing information that includes the lowest hop count.

For example, referring to FIG. 2, the UE 210 with timing information (x, R) receives timing information from the UE 214. The timing information from the UE 214 has a reliability indicator s of reliable R and a hop count y, where y<x. Because the hop count y associated with the timing information from the UE 214 is lower than the hop count x associated with the timing information of the UE 210, and because the reliability indicator s of the timing information from the UE 214 is reliable R, the UE 210 determines new timing information (in step 810) by setting the hop count to y+1, which is one more than the lowest hop count y and by setting the reliability indicator s to indicate that the broadcasted synchronization signal is reliable R. The synchronization signal is broadcasted (in step 812) based on the synchronization signal corresponding to the timing information that includes the lowest hop count.

Figure 9:
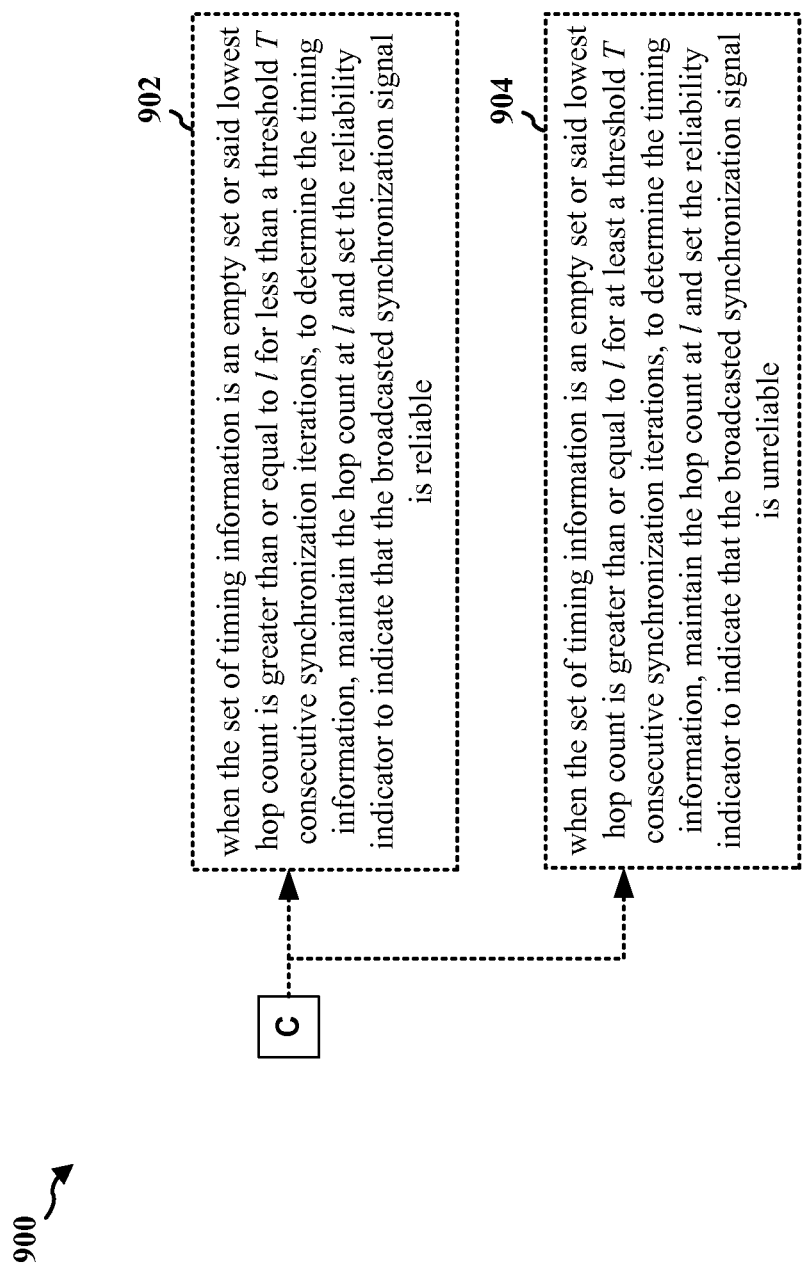
FIG. 9 is a flow chart of a seventh method of wireless communication.

FIG. 9 is a flow chart 900 of a seventh method of wireless communication. The method may be performed by a UE. The steps in C include the steps in boxes 902, 904. In box 902, when the set of timing information is an empty set (i.e., the UE did not receive timing information with at least one reliable state) or the lowest hop count is greater than or equal to 1 for less than a threshold T consecutive synchronization iterations, the UE determines the timing by maintaining the hop count at 1 and by setting the reliability indicator to indicate that the broadcasted synchronization signal is reliable. In box 904, when the set of timing information is an empty set (i.e., the UE did not receive timing information with at least one reliable state) or the lowest hop count is greater than or equal to 1 for at least a threshold T consecutive synchronization iterations, the UE determines the timing information (in step 810) by maintaining the hop count at 1 and by setting the reliability indicator to indicate that the broadcasted synchronization signal is unreliable.

For example, referring to FIG. 2, the UE 210 broadcasts a synchronization signal with its timing information of (y+1, R). However, after the UE 214 moves 218 out of proximity of the UE 210, the UE 210 continues to broadcast its synchronization signal with its timing information of (y+1, R) for T consecutive synchronization iterations. After T consecutive synchronization iterations, the UE 210 sets its timing information to (y+1, U).

Figure 10:
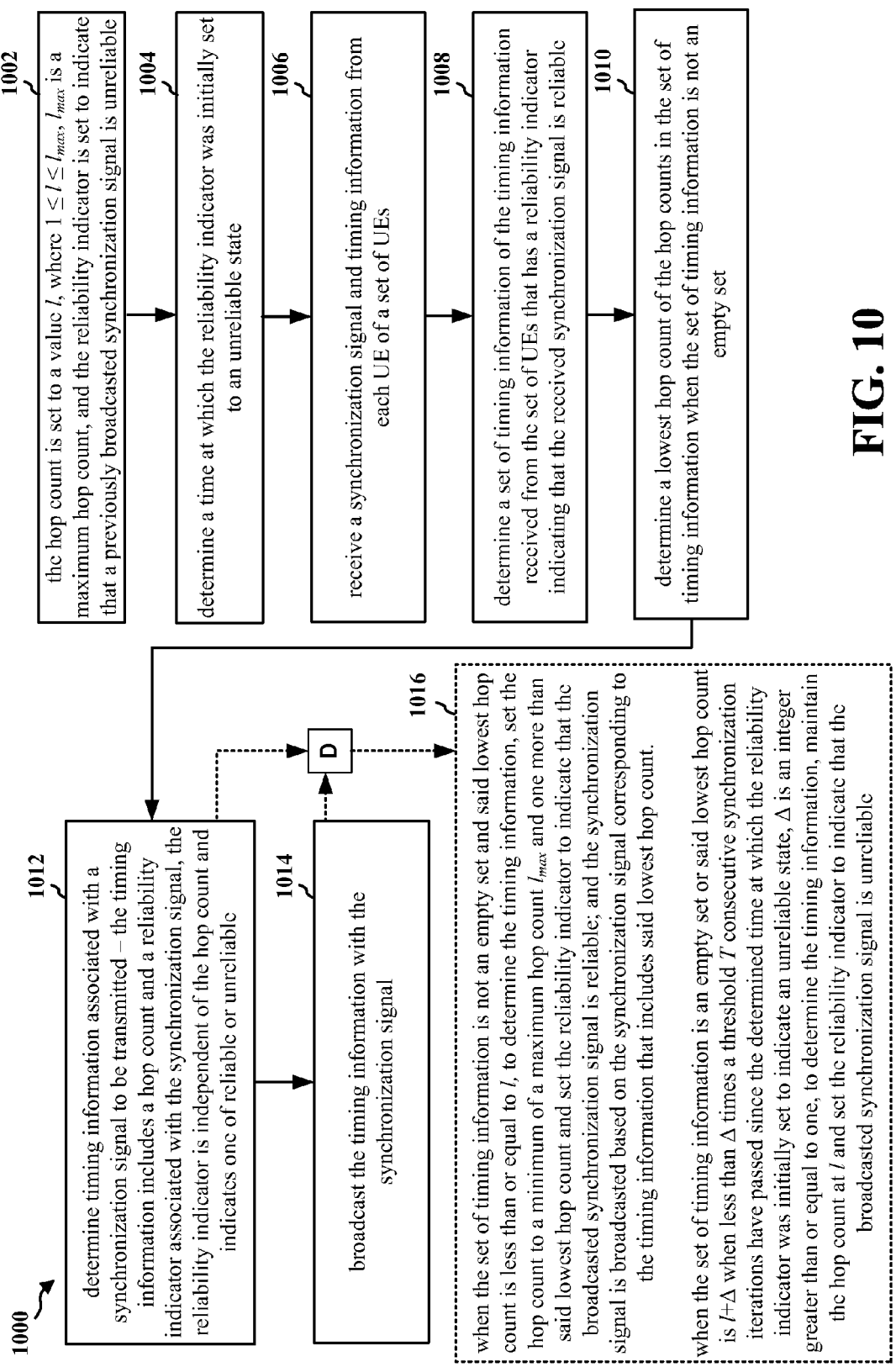
FIG. 10 is a flow chart of an eighth method of wireless communication.

FIG. 10 is a flow chart 1000 of a eighth method of wireless communication. The method may be performed by a UE. In step 1002, the UE sets the hop count to a value l, where $1 \leq l \leq l_{max}$, $l_{max}$ is a maximum hop count, and sets the reliability indicator to indicate that a previously broadcasted synchronization signal is unreliable. In step 1004, the UE determines a time at which the reliability indicator was initially set to an unreliable state. In step 1006, the UE receives a synchronization signal and timing information from each UE of a set of UEs. In step 1008, the UE determines a set of timing information of the timing information received from the set of UEs that has a reliability indicator indicating that the received synchronization signal is reliable. In step 1010, the UE determines a lowest hop count of the hop counts in the set of timing information when the set of timing information is not an empty set (i.e., the UE received timing information with at least one reliable state). In step 1012, the UE determines timing information associated with a synchronization signal to be transmitted. The timing information includes a hop count and a reliability indicator associated with the synchronization signal. The reliability indicator is independent of the hop count and indicating one of reliable or unreliable. In step 1014, the UE broadcasts the timing information with the synchronization signal. The steps 1012, 1014 may be performed by performing the steps in D, which include the step in box 1016. In box 1016, when the set of timing information is not an empty set (i.e., the UE received timing information with at least one reliable state) and the lowest hop count is less than or equal to 1, the UE determines the timing information (in step 1012) by setting the hop count to a minimum of a maximum hop count $l_{max}$ and one more than the lowest hop count and by setting the reliability indicator to indicate that the broadcasted synchronization signal is reliable. The synchronization signal is broadcasted (in step 1014) based on the synchronization signal corresponding to the timing information that includes the lowest hop count. In box 1016, when the set of timing information is an empty set (i.e., the UE did not receive timing information with at least one reliable state) or the lowest hop count is 1+Δ when less than Δ times a threshold T consecutive synchronization iterations have passed since the determined time at which the reliability indicator was initially set to indicate an unreliable state, Δ being an integer greater than or equal to one, the UE determines the timing information (in step 1012) by maintaining the hop count at 1 and by setting the reliability indicator to indicate that the broadcasted synchronization signal is unreliable.

Figure 11:
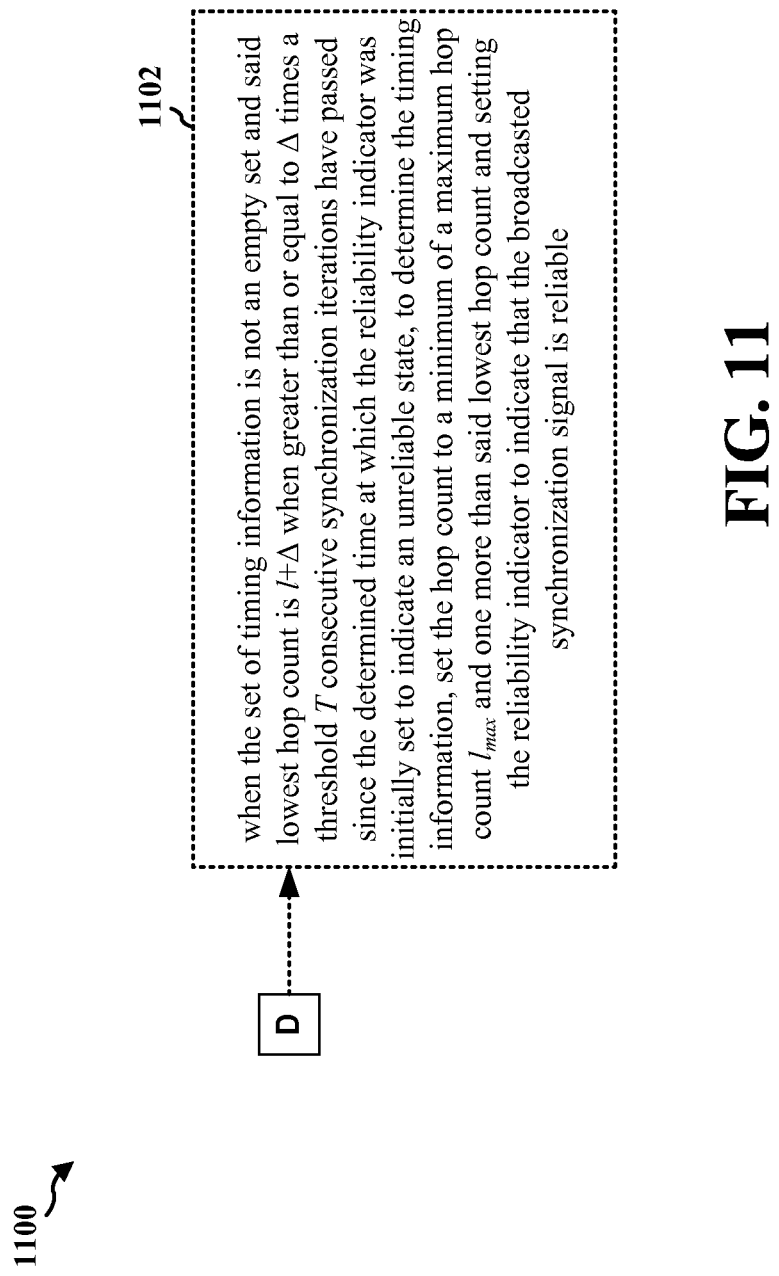
FIG. 11 is a flow chart of a ninth method of wireless communication.

FIG. 11 is a flow chart 1100 of a ninth method of wireless communication. The method may be performed by a UE. The steps in D include the step in box 1102. In box 1102, when the set of timing information is not an empty set (i.e., the UE received timing information with at least one reliable state) and the lowest hop count is 1+Δ when greater than or equal to Δ times a threshold T consecutive synchronization iterations have passed since the determined time at which the reliability indicator was initially set to indicate an unreliable state, the UE determines the timing information (in step 1012) by setting the hop count to a minimum of a maximum hop count $l_{max}$ and one more than the lowest hop count and by setting the reliability indicator to indicate that the broadcasted synchronization signal is reliable.

Figure 12:
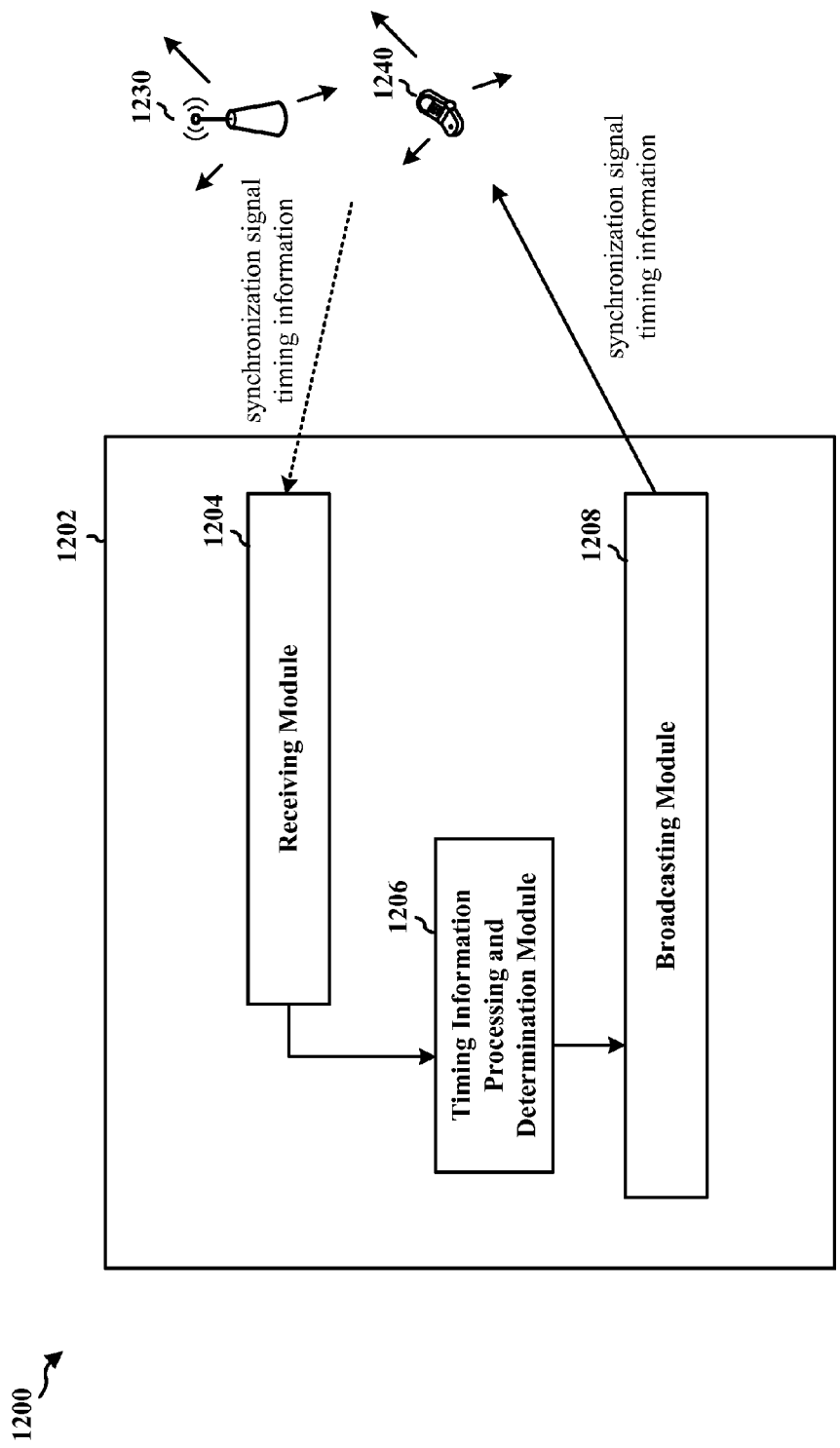
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus 1202 may be a UE. The UE includes a timing information processing and determination module 1206 that is configured to determine timing information associated with a synchronization signal to be transmitted. The timing information includes a hop count and a reliability indicator associated with the synchronization signal. The reliability indicator is independent of the hop count and indicates one of reliable or unreliable. The UE further includes a broadcasting module 1208 that is configured to broadcast the timing information with the synchronization signal to other UEs 1240. The hop count may be a number of hops the synchronization signal is from a base station synchronization signal received from a base station 1230. The UE may further include a receiving module 1204 that is configured to receive the base station synchronization signal from the base station 1230 upon the UE turning on. The synchronization signal may be broadcasted based on the base station synchronization signal. The timing information processing and determination module 1206 may be configured to determine the timing information by setting the hop count to zero and the reliability indicator to indicate that the broadcasted synchronization signal is reliable. The timing information processing and determination module 1206 may be configured to determine that no synchronization signals have been received from other wireless devices upon the UE turning on. The timing information processing and determination module 1206 may be configured to determine the timing information by setting the hop count to a maximum hop count $l_{max}$ and the reliability indicator to indicate that the broadcasted synchronization signal is unreliable.

The receiving module 1204 may be configured to receive a synchronization signal and timing information from each UE of a set of UEs upon the UE turning on. The timing information processing and determination module 1206 may be configured to determine a set of timing information of the timing information received from the set of UEs that has a reliability indicator indicating that the received synchronization signal is reliable. The timing information processing and determination module 1206 may be configured to determine a lowest hop count of the hop counts in the set of timing information when the set of timing information is not an empty set. When the set of timing information is not an empty set, the timing information processing and determination module 1206 may be configured to determine the timing information by setting the hop count to a minimum of a maximum hop count $l_{max}$ and one more than the lowest hop count of the hop counts in the set of timing information, and by setting the reliability indicator to indicate that the broadcasted synchronization signal is reliable. The broadcasting module 1208 may be configured to broadcast the synchronization signal based on the synchronization signal corresponding to the timing information that includes the lowest hop count of the hop counts in the set of timing information. The timing information processing and determination module 1206 may be configured to determine a second set of timing information of the timing information received from the set of UEs that has a reliability indicator indicating that the received synchronization signal is unreliable when the set of timing information is an empty set. The timing information processing and determination module 1206 may be configured to determine a lowest hop count of the hop counts in the second set of timing information. When the second set of timing information is not an empty set, the timing information processing and determination module 1206 may be configured to determine the timing information by setting the hop count to a minimum of a maximum hop count $l_{max}$ and one more than the lowest hop count of the hop counts in the second set of timing information, and by setting the reliability indicator to indicate that the broadcasted synchronization signal is unreliable. The broadcasting module 1208 may be configured to broadcast the synchronization signal based on the synchronization signal corresponding to the timing information that includes the lowest hop count of the hop counts in the second set of timing information.

The timing information processing and determination module 1206 may be configured to set the hop count to a value l, where $1 \leq l \leq l_{max}$, $l_{max}$ is a maximum hop count, and to set the reliability indicator to indicate that a previously broadcasted synchronization signal is reliable. The receiving module 1204 may be configured to receive a synchronization signal and timing information from each UE of a set of UEs. The timing information processing and determination module 1206 may be configured to determine a set of timing information of the timing information received from the set of UEs that has a reliability indicator indicating that the received synchronization signal is reliable. The timing information processing and determination module 1206 may be configured to determine a lowest hop count of the hop counts in the set of timing information when the set of timing information is not an empty set. When the set of timing information is not an empty set and the lowest hop count is less than l, the timing information processing and determination module 1206 may be configured to determine the timing information by setting the hop count to one more than the lowest hop count and by setting the reliability indicator to indicate that the broadcasted synchronization signal is reliable. The broadcasting module 1208 may be configured to broadcast the synchronization signal based on the synchronization signal corresponding to the timing information that includes the lowest hop count. In one configuration, when the set of timing information is an empty set or the lowest hop count is greater than or equal to l for less than a threshold T consecutive synchronization iterations, the timing information processing and determination module 1206 may be configured to determine the timing information by maintaining the hop count at l and by setting the reliability indicator to indicate that the broadcasted synchronization signal is reliable. In one configuration, when the set of timing information is an empty set or the lowest hop count is greater than or equal to l for at least a threshold T consecutive synchronization iterations, the timing information processing and determination module 1206 may be configured to determine the timing information by maintaining the hop count at l and by setting the reliability indicator to indicate that the broadcasted synchronization signal is unreliable.

The timing information processing and determination module 1206 may be configured to set the hop count to a value l, where $1 \leq l \leq l_{max}$, $l_{max}$ is a maximum hop count, and set the reliability indicator to indicate that a previously broadcasted synchronization signal is unreliable. The timing information processing and determination module 1206 may be configured to determine a time at which the reliability indicator was initially set to an unreliable state. The receiving module 1204 may be configured to receive a synchronization signal and timing information from each UE of a set of UEs. The timing information processing and determination module 1206 may be configured to determine a set of timing information of the timing information received from the set of UEs that has a reliability indicator indicating that the received synchronization signal is reliable. The timing information processing and determination module 1206 may be configured to determine a lowest hop count of the hop counts in the set of timing information when the set of timing information is not an empty set. When the set of timing information is not an empty set and the lowest hop count is less than or equal to l, the timing information processing and determination module 1206 may be configured to determine the timing information by setting the hop count to a minimum of a maximum hop count $l_{max}$ and one more than the lowest hop count and by setting the reliability indicator to indicate that the broadcasted synchronization signal is reliable. The broadcasting module 1208 may be configured to broadcast the synchronization signal based on the synchronization signal corresponding to the timing information that includes the lowest hop count. When the set of timing information is an empty set or the lowest hop count is $l+\Delta$ when less than $\Delta$ times a threshold T consecutive synchronization iterations have passed since the determined time at which the reliability indicator was initially set to indicate an unreliable state, $\Delta$ being an integer greater than or equal to one, the timing information processing and determination module 1206 may be configured to determine the timing information by maintaining the hop count at l and by setting the reliability indicator to indicate that the broadcasted synchronization signal is unreliable. When the set of timing information is not an empty set and the lowest hop count is $l+\Delta$ when greater than or equal to $\Delta$ times a threshold T consecutive synchronization iterations have passed since the determined time at which the reliability indicator was initially set to indicate an unreliable state, the timing information processing and determination module 1206 may be configured to determine the timing information by setting the hop count to a minimum of a maximum hop count $l_{max}$ and one more than the lowest hop count and by setting the reliability indicator to indicate that the broadcasted synchronization signal is reliable.

The apparatus may include additional modules that perform each of the steps of the algorithm in the aforementioned flow charts of FIGS. 3-11. As such, each step in the aforementioned flow charts of FIGS. 3-11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
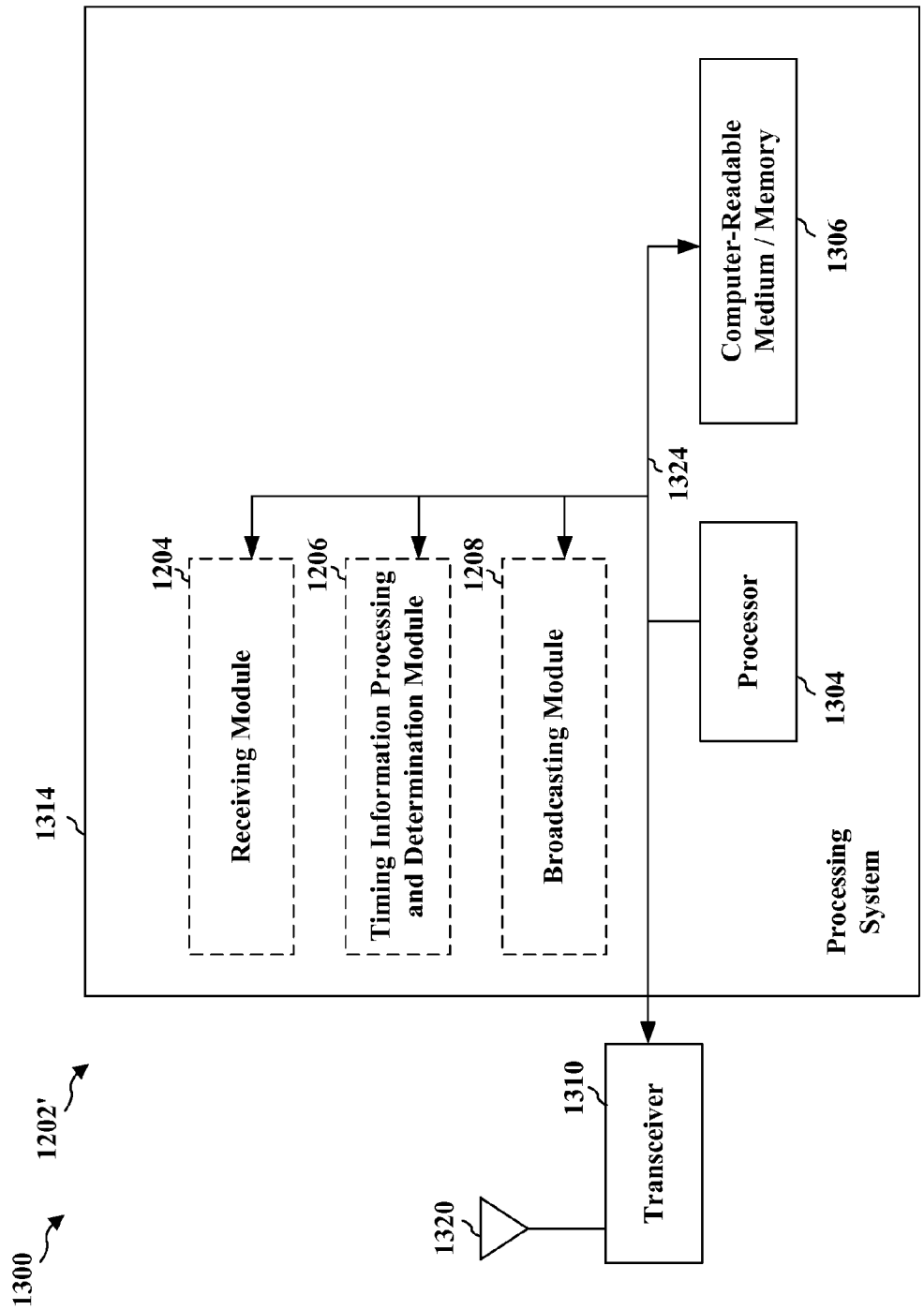
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, and the computer-readable medium/memory 1306. The bus 1324 may also link various other circuits such as timing sources, peripherals, voltage regulators, and power management circuits, which are well known in the art, and therefore, will not be described any further. The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314. In addition, the transceiver 1310 receives information from the processing system 1314, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the modules 1204, 1206, 1208. The modules may be software modules running in the processor 1304, resident/stored in the computer readable medium/memory 1306, one or more hardware modules coupled to the processor 1304, or some combination thereof.

In one configuration, the apparatus 1202/1202' for wireless communication may be a UE. The UE includes means for determining timing information associated with a synchronization signal to be transmitted. The timing information includes a hop count and a reliability indicator associated with the synchronization signal. The reliability indicator is independent of the hop count and indicates one of reliable or unreliable. The UE further includes means for broadcasting the timing information with the synchronization signal. The hop count may be a number of hops the synchronization signal is from a base station synchronization signal received from a base station. The UE may further include means for receiving the base station synchronization signal from the base station upon the UE turning on. The synchronization signal may be broadcasted based on the base station synchronization signal, and the means for determining the timing information may be configured to set the hop count to zero and the reliability indicator to indicate that the broadcasted synchronization signal is reliable. The UE may further include means for determining that no synchronization signals have been received from other wireless devices upon the UE turning on. The means for determining the timing information may be configured to set the hop count to a maximum hop count $l_{max}$ and the reliability indicator to indicate that the broadcasted synchronization signal is unreliable.

The UE may further include means for receiving a synchronization signal and timing information from each UE of a set of UEs upon the UE turning on, means for determining a set of timing information of the timing information received from the set of UEs that has a reliability indicator indicating that the received synchronization signal is reliable, and means for determining a lowest hop count of the hop counts in the set of timing information when the set of timing information is not an empty set. When the set of timing information is not an empty set, the means for determining the timing information may be configured to set the hop count to a minimum of a maximum hop count $l_{max}$ and one more than the lowest hop count of the hop counts in the set of timing information, and to set the reliability indicator to indicate that the broadcasted synchronization signal is reliable. The synchronization signal may be broadcasted based on the synchronization signal corresponding to the timing information that includes the lowest hop count of the hop counts in the set of timing information. The UE may further include means for determining a second set of timing information of the timing information received from the set of UEs that has a reliability indicator indicating that the received synchronization signal is unreliable when the set of timing information is an empty set, and means for determining a lowest hop count of the hop counts in the second set of timing information. When the second set of timing information is not an empty set, the means for determining the timing information may be configured to set the hop count to a minimum of a maximum hop count $l_{max}$ and one more than the lowest hop count of the hop counts in the second set of timing information, and to set the reliability indicator to indicate that the broadcasted synchronization signal is unreliable. The synchronization signal may be broadcasted based on the synchronization signal corresponding to the timing information that includes the lowest hop count of the hop counts in the second set of timing information.

The hop count may be set to a value l, where $1 \leq l \leq l_{max}$, $l_{max}$ is a maximum hop count, and the reliability indicator may be set to indicate that a previously broadcasted synchronization signal is reliable. The UE may further include means for receiving a synchronization signal and timing information from each UE of a set of UEs, means for determining a set of timing information of the timing information received from the set of UEs that has a reliability indicator indicating that the received synchronization signal is reliable, and means for determining a lowest hop count of the hop counts in the set of timing information when the set of timing information is not an empty set. When the set of timing information is not an empty set and the lowest hop count is less than l, the means for determining the timing information may be configured to set the hop count to one more than the lowest hop count and to set the reliability indicator to indicate that the broadcasted synchronization signal is reliable. The synchronization signal may be broadcasted based on the synchronization signal corresponding to the timing information that includes the lowest hop count. When the set of timing information is an empty set or the lowest hop count is greater than or equal to 1 for less than a threshold T consecutive synchronization iterations, the means for determining the timing information may be configured to maintain the hop count at 1 and to set the reliability indicator to indicate that the broadcasted synchronization signal is reliable. When the set of timing information is an empty set or the lowest hop count is greater than or equal to 1 for at least a threshold T consecutive synchronization iterations, the means for determining the timing information may be configured to maintain the hop count at 1 and to set the reliability indicator to indicate that the broadcasted synchronization signal is unreliable.

The hop count may be set to a value l, where $1 \leq l \leq l_{max}$, $l_{max}$ is a maximum hop count, and the reliability indicator may be set to indicate that a previously broadcasted synchronization signal is unreliable. The UE may further include means for determining a time at which the reliability indicator was initially set to an unreliable state, means for receiving a synchronization signal and timing information from each UE of a set of UEs, means for determining a set of timing information of the timing information received from the set of UEs that has a reliability indicator indicating that the received synchronization signal is reliable, and means for determining a lowest hop count of the hop counts in the set of timing information when the set of timing information is not an empty set. When the set of timing information is not an empty set and the lowest hop count is less than or equal to l, the means for determining the timing information may be configured to set the hop count to a minimum of a maximum hop count $l_{max}$ and one more than the lowest hop count and to set the reliability indicator to indicate that the broadcasted synchronization signal is reliable. The synchronization signal may be broadcasted based on the synchronization signal corresponding to the timing information that includes the lowest hop count. When the set of timing information is an empty set or the lowest hop count is l+Δ when less than Δ times a threshold T consecutive synchronization iterations have passed since the determined time at which the reliability indicator was initially set to indicate an unreliable state, Δ being an integer greater than or equal to one, the means for determining the timing information may be configured to maintain the hop count at 1 and to set the reliability indicator to indicate that the broadcasted synchronization signal is unreliable. When the set of timing information is not an empty set and the lowest hop count is l+Δ when greater than or equal to Δ times a threshold T consecutive synchronization iterations have passed since the determined time at which the reliability indicator was initially set to indicate an unreliable state, the means for determining the timing information may be configured to set the hop count to a minimum of a maximum hop count $l_{max}$ and one more than the lowest hop count and to set the reliability indicator to indicate that the broadcasted synchronization signal is reliable. The aforementioned means may be one or more of the aforementioned modules of the apparatus 1202 and/or the processing system 1314 of the apparatus 1202' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE), the method comprising:
   receiving a synchronization signal and timing information from each UE of a set of UEs upon the UE turning on;
   determining a set of reliable timing information of the timing information received from the set of UEs, wherein the reliable timing information includes a reliability indicator indicating that the received synchronization signal is reliable;
   determining a lowest hop count of one or more hop counts in the set of reliable timing information when the set of reliable timing information is not an empty set;
   determining a second timing information associated with a second synchronization signal to be transmitted, the second timing information including a second hop count and a second reliability indicator associated with the second synchronization signal, the second reliability indicator being independent of the second hop count and indicating one of reliable or unreliable; and
   broadcasting the second timing information with the second synchronization signal, wherein the second reliability indicator included in the second timing information is set by the UE to the one of reliable or unreliable, wherein when the set of reliable timing information is not an empty set:
  the determining the second timing information comprises setting the second hop count to a minimum of a maximum hop count $l_{max}$ and one more than said lowest hop count of the one or more hop counts in the set of reliable timing information, and setting the second reliability indicator to indicate that the broadcasted second synchronization signal is reliable, and
  the second synchronization signal is broadcasted based on the synchronization signal corresponding to the timing information that includes said lowest hop count of the one or more hop counts in the set of reliable timing information.

2. The method of claim 1, further comprising:
  determining a second set of unreliable timing information of the timing information received from the set of UEs, wherein the unreliable timing information includes a reliability indicator indicating that the received synchronization signal is unreliable when the set of reliable timing information is an empty set; and
  determining a lowest hop count of the hop counts in the second set of unreliable timing information,
  wherein when the second set of unreliable timing information is not an empty set:
    the determining the second timing information comprises setting the second hop count to a minimum of a maximum hop count $l_{max}$ and one more than said lowest hop count of the hop counts in the second set of unreliable timing information, and setting the second reliability indicator to indicate that the broadcasted second synchronization signal is unreliable, and
    the second synchronization signal is broadcasted based on the synchronization signal corresponding to the timing information that includes said lowest hop count of the hop counts in the second set of unreliable timing information.

3. A method of wireless communication of a user equipment (UE), the method comprising:
  receiving a synchronization signal and timing information from each UE of a set of UEs;
  determining a set of reliable timing information of the timing information received from the set of UEs, wherein the reliable timing information includes a reliability indicator indicating that the received synchronization signal is reliable;
  determining a lowest hop count of one or more hop counts in the set of reliable timing information when the set of reliable timing information is not an empty set;
  determining a second timing information associated with a second synchronization signal to be transmitted, the second timing information including a second hop count and a second reliability indicator associated with the second synchronization signal, the second reliability indicator being independent of the second hop count and indicating one of reliable or unreliable; and
  broadcasting the second timing information with the second synchronization signal, wherein the second reliability indicator included in the second timing information is set by the UE to the one of reliable or unreliable, and wherein the second hop count is set to a value l, where $1 \leq l \leq l_{max}$, $l_{max}$ being a maximum hop count, and wherein the second reliability indicator is set to indicate that a previously broadcasted synchronization signal is reliable,
  wherein when the set of reliable timing information is not an empty set and said lowest hop count is less than l:
    the determining the second timing information comprises setting the second hop count to one more than said lowest hop count and setting the reliability indicator to indicate that the broadcasted second synchronization signal is reliable, and
    the second synchronization signal is broadcasted based on the synchronization signal corresponding to the timing information that includes said lowest hop count.

4. The method of claim 3, wherein when the set of reliable timing information is an empty set or said lowest hop count is greater than or equal to l for less than a threshold T consecutive synchronization iterations, the determining the second timing information comprises maintaining the second hop count at l and setting the second reliability indicator to indicate that the broadcasted second synchronization signal is reliable.

5. The method of claim 3, wherein when the set of reliable timing information is an empty set or said lowest hop count is greater than or equal to l for at least a threshold T consecutive synchronization iterations, the determining the second timing information comprises maintaining the second hop count at l and setting the second reliability indicator to indicate that the broadcasted second synchronization signal is unreliable.

6. A method of wireless communication of a user equipment (UE), the method comprising:
  determining a time at which a reliability indicator was initially set to an unreliable state;
  receiving a synchronization signal and timing information from each UE of a set of UEs;
  determining a set of reliable timing information of the timing information received from the set of UEs, wherein the timing information includes a reliability indicator indicating that the received synchronization signal is reliable;
  determining a lowest hop count of one or more hop counts in the set of reliable timing information when the set of reliable timing information is not an empty set;
  determining a second timing information associated with a second synchronization signal to be transmitted, the second timing information including a second hop count and a second reliability indicator associated with the second synchronization signal, the second reliability indicator being independent of the second hop count and indicating one of reliable or unreliable; and
  broadcasting the second timing information with the second synchronization signal, wherein the second reliability indicator included in the second timing information is set by the UE to the one of reliable or unreliable, and wherein the hop count is set to a value l, where $1 \leq l \leq l_{max}$, $l_{max}$ being a maximum hop count, and wherein the reliability indicator is set to indicate that a previously broadcasted synchronization signal is unreliable,
  wherein when the set of reliable timing information is not an empty set and said lowest hop count is less than or equal to l:
    the determining the second timing information comprises setting the second hop count to a minimum of a maximum hop count $l_{max}$ and one more than said lowest hop count and setting the second reliability indicator to indicate that the broadcasted second synchronization signal is reliable, and the second synchronization signal is broadcasted based on the synchronization signal corresponding to the timing information that includes said lowest hop count;

wherein when the set of reliable timing information is an empty set or said lowest hop count is 1+Δ when less than Δ times a threshold T consecutive synchronization iterations have passed since the determined time at which the second reliability indicator was initially set to indicate an unreliable state, Δ being an integer greater than or equal to one, the determining the second timing information comprises maintaining the second hop count at 1 and setting the second reliability indicator to indicate that the broadcasted second synchronization signal is unreliable.

7. The method of claim 6, wherein when the set of reliable timing information is not an empty set and said lowest hop count is 1+Δ when greater than or equal to Δ times a threshold T consecutive synchronization iterations have passed since the determined time at which the second reliability indicator was initially set to indicate an unreliable state, the determining the second timing information comprises setting the second hop count to a minimum of a maximum hop count $l_{max}$ and one more than said lowest hop count and setting the second reliability indicator to indicate that the broadcasted second synchronization signal is reliable.

8. A user equipment (UE), the UE comprising:
means for receiving a synchronization signal and timing information from each UE of a set of UEs upon the UE turning on;
means for determining a set of reliable timing information of the timing information received from the set of UEs that has a reliability indicator indicating that the received synchronization signal is reliable;
means for determining a lowest hop count of one or more hop counts in the set of reliable timing information when the set of reliable timing information is not an empty set;
means for determining timing information associated with a second synchronization signal to be transmitted, the timing information including a hop count and a reliability indicator associated with the synchronization signal, the reliability indicator being independent of the hop count and indicating one of reliable or unreliable; and
means for broadcasting the timing information with the second synchronization signal, wherein the reliability indicator included in the timing information is set by the UE to the one of reliable or unreliable,
wherein when the set of reliable timing information is not an empty set:
 the means for determining the timing information is configured to set the hop count to a minimum of a maximum hop count $l_{max}$ and one more than said lowest hop count of the one or more hop counts in the set of reliable timing information, and to set the reliability indicator to indicate that the broadcasted second synchronization signal is reliable, and
 the second synchronization signal is broadcasted based on the synchronization signal corresponding to the timing information that includes said lowest hop count of the one or more hop counts in the set of reliable timing information.

9. The apparatus of claim 8, further comprising:
means for determining a second set of unreliable timing information of the timing information received from the set of UEs that has a reliability indicator indicating that the received synchronization signal is unreliable when the set of reliable timing information is an empty set; and
means for determining a lowest hop count of the one or more hop counts in the second set of unreliable timing information,
wherein when the second set of unreliable timing information is not an empty set:
 the means for determining the timing information is configured to set the hop count to a minimum of a maximum hop count $l_{max}$ and one more than said lowest hop count of the hop counts in the second set of unreliable timing information, and to set the reliability indicator to indicate that the broadcasted synchronization signal is unreliable, and
 the second synchronization signal is broadcasted based on the synchronization signal corresponding to the timing information that includes said lowest hop count of the hop counts in the second set of unreliable timing information.

10. An apparatus for wireless communication, the apparatus being a user equipment (UE) and comprising:
means for receiving a synchronization signal and timing information from each UE of a set of UEs;
means for determining a set of reliable timing information of the timing information received from the set of UEs that has a reliability indicator indicating that the received synchronization signal is reliable;
means for determining a lowest hop count of one or more hop counts in the set of reliable timing information when the set of reliable timing information is not an empty set;
means for determining timing information associated with a second synchronization signal to be transmitted, the timing information including a hop count and a reliability indicator associated with the synchronization signal, the reliability indicator being independent of the hop count and indicating one of reliable or unreliable; and
means for broadcasting the timing information with the second synchronization signal, wherein the reliability indicator included in the timing information is set by the UE to the one of reliable or unreliable, and wherein the hop count is set to a value l, where $1 \leq l \leq l_{max}$, $l_{max}$ being a maximum hop count, and wherein the reliability indicator is set to indicate that a previously broadcasted second synchronization signal is reliable,
wherein when the set of reliable timing information is not an empty set and said lowest hop count is less than l:
 the means for determining the timing information is configured to set the hop count to one more than said lowest hop count and to set the reliability indicator to indicate that the broadcasted synchronization signal is reliable, and
 the second synchronization signal is broadcasted based on the synchronization signal corresponding to the timing information that includes said lowest hop count.

11. The apparatus of claim 10, wherein when the set of reliable timing information is an empty set or said lowest hop count is greater than or equal to l for less than a threshold T consecutive synchronization iterations, the means for determining the timing information is configured to maintain the hop count at 1 and to set the reliability indicator to indicate that the broadcasted second synchronization signal is reliable.

12. The apparatus of claim 10, wherein when the set of reliable timing information is an empty set or said lowest hop count is greater than or equal to 1 for at least a threshold T consecutive synchronization iterations, the means for determining the timing information is configured to maintain the hop count at 1 and to set the reliability indicator to indicate that the broadcasted second synchronization signal is unreliable.

13. An apparatus for wireless communication, the apparatus being a user equipment (UE) and comprising:
   means for determining a time at which the reliability indicator was initially set to an unreliable state;
   means for receiving a synchronization signal and timing information from each UE of a set of UEs;
   means for determining a set of reliable timing information of the timing information received from the set of UEs that has a reliability indicator indicating that the received synchronization signal is reliable;
   means for determining a lowest hop count of one or more hop counts in the set of reliable timing information when the set of reliable timing information is not an empty set;
   means for determining timing information associated with a second synchronization signal to be transmitted, the timing information including a hop count and a reliability indicator associated with the synchronization signal, the reliability indicator being independent of the hop count and indicating one of reliable or unreliable; and
   means for broadcasting the timing information with the second synchronization signal, wherein the reliability indicator included in the timing information is set by the UE to the one of reliable or unreliable, and wherein the hop count is set to a value l, where $1 \le l \le l_{max}$, $l_{max}$ being a maximum hop count, and wherein the reliability indicator is set to indicate that a previously broadcasted second synchronization signal is unreliable,
   wherein when the set of reliable timing information is not an empty set and said lowest hop count is less than or equal to 1:
      the means for determining the timing information is configured to set the hop count to a minimum of a maximum hop count $l_{max}$ and one more than said lowest hop count and to set the reliability indicator to indicate that the broadcasted second synchronization signal is reliable, and
      the second synchronization signal is broadcasted based on the synchronization signal corresponding to the timing information that includes said lowest hop count;
   wherein when the set of reliable timing information is an empty set or said lowest hop count is 1+Δ when less than Δ times a threshold T consecutive synchronization iterations have passed since the determined time at which the reliability indicator was initially set to indicate an unreliable state, Δ being an integer greater than or equal to one, the means for determining the timing information is configured to maintain the hop count at 1 and to set the reliability indicator to indicate that the broadcasted second synchronization signal is unreliable.

14. The apparatus of claim 13, wherein when the set of reliable timing information is not an empty set and said lowest hop count is 1+Δ when greater than or equal to Δ times a threshold T consecutive synchronization iterations have passed since the determined time at which the reliability indicator was initially set to indicate an unreliable state, the means for determining the timing information is configured to set the hop count to a minimum of a maximum hop count $l_{max}$ and one more than said lowest hop count and to set the reliability indicator to indicate that the broadcasted second synchronization signal is reliable.

15. An apparatus for wireless communication, the apparatus being a user equipment (UE) and comprising:
   a memory; and
   at least one processor coupled to the memory and configured to:
      receive a synchronization signal and timing information from each UE of a set of UEs upon the UE turning on;
      determine a set of reliable timing information of the timing information received from the set of UEs that has a reliability indicator indicating that the received synchronization signal is reliable;
      determine a lowest hop count of one or more hop counts in the set of reliable timing information when the set of reliable timing information is not an empty set;
      determine timing information associated with a second synchronization signal to be transmitted, the timing information including a hop count and a reliability indicator associated with the synchronization signal, the reliability indicator being independent of the hop count and indicating one of reliable or unreliable; and
      broadcast the timing information with the second synchronization signal, wherein the reliability indicator included in the timing information is set by the UE to the one of reliable or unreliable,
   wherein when the set of reliable timing information is not an empty set:
      the at least one processor is configured to determine the timing information by setting the hop count to a minimum of a maximum hop count and one more than said lowest hop count of the one or more hop counts in the set of reliable timing information, and by setting the reliability indicator to indicate that the broadcasted second synchronization signal is reliable, and
      the second synchronization signal is broadcasted based on the synchronization signal corresponding to the timing information that includes said lowest hop count of the one or more hop counts in the set of reliable timing information.

16. An apparatus for wireless communication, the apparatus being a user equipment (UE) and comprising:
   a memory; and
   at least one processor coupled to the memory and configured to:
      receive a synchronization signal and timing information from each UE of a set of UEs;
      determine a set of reliable timing information of the timing information received from the set of UEs that has a reliability indicator indicating that the received synchronization signal is reliable;
      determine a lowest hop count of one or more hop counts in the set of reliable timing information when the set of reliable timing information is not an empty set;
      determine timing information associated with a synchronization signal to be transmitted, the timing information including a hop count and a reliability indicator associated with the synchronization signal, the reliability indicator being independent of the hop count and indicating one of reliable or unreliable; and broadcast the timing information with the second synchronization signal, wherein the reliability indicator included in the timing information is set by the UE to the one of reliable or unreliable, and wherein the hop count is set to a value l, where $1 \leq l \leq l_{max}$, $l_{max}$ being a maximum hop count, and wherein the reliability indicator is set to indicate that a previously broadcasted synchronization signal is reliable, wherein when the set of reliable timing information is not an empty set and said lowest hop count is less than l:
the at least one processor is configured to determine the timing information by setting the hop count to one more than said lowest hop count and by setting the reliability indicator to indicate that the broadcasted second synchronization signal is reliable, and the second synchronization signal is broadcasted based on the synchronization signal corresponding to the timing information that includes said lowest hop count.

17. An apparatus for wireless communication, the apparatus being a user equipment (UE) and comprising:
a memory; and
at least one processor coupled to the memory and configured to:
determine a time at which a reliability indicator was initially set to an unreliable state;
receive a synchronization signal and timing information from each UE of a set of UEs;
determine a set of reliable timing information of the timing information received from the set of UEs that has a reliability indicator indicating that the received synchronization signal is reliable;
determine a lowest hop count of one or more hop counts in the set of reliable timing information when the set of reliable timing information is not an empty set;
determine timing information associated with a second synchronization signal to be transmitted, the timing information including a hop count and a reliability indicator associated with the synchronization signal, the reliability indicator being independent of the hop count and indicating one of reliable or unreliable; and
broadcast the timing information with the second synchronization signal, wherein the reliability indicator included in the timing information is set by the UE to the one of reliable or unreliable, and wherein the hop count is set to a value l, where $1 \leq l \leq l_{max}$, $l_{max}$ being a maximum hop count, and wherein the reliability indicator is set to indicate that a previously broadcasted second synchronization signal is unreliable, wherein when the set of reliable timing information is not an empty set and said lowest hop count is less than or equal to l:
the at least one processor is configured to determine the timing information by setting the hop count to a minimum of a maximum hop count $l_{max}$ and one more than said lowest hop count and by setting the reliability indicator to indicate that the broadcasted second synchronization signal is reliable, and the second synchronization signal is broadcasted based on the synchronization signal corresponding to the timing information that includes said lowest hop count;

wherein when the set of reliable timing information is an empty set or said lowest hop count is $l+\Delta$ when less than $\Delta$ times a threshold T consecutive synchronization iterations have passed since the determined time at which the reliability indicator was initially set to indicate an unreliable state, $\Delta$ being an integer greater than or equal to one, the at least one processor is configured to determine the timing information by maintaining the hop count at l and by setting the reliability indicator to indicate that the broadcasted second synchronization signal is unreliable.

18. A non-transitory computer-readable medium storing computer-executable code, that when executed by a processor, cause the processor to:
receive a synchronization signal and timing information from each UE of a set of UEs upon the UE turning on;
determine a set of reliable timing information of the timing information received from the set of UEs that has a reliability indicator indicating that the received synchronization signal is reliable;
determine a lowest hop count of one or more hop counts in the set of reliable timing information when the set of reliable timing information is not an empty set;
determine timing information associated with a second synchronization signal to be transmitted, the timing information including a hop count and a reliability indicator associated with the synchronization signal, the reliability indicator being independent of the hop count and indicating one of reliable or unreliable; and
broadcast the timing information with the second synchronization signal, wherein the reliability indicator included in the timing information is set by the UE to the one of reliable or unreliable,
wherein when the set of reliable timing information is not an empty set:
the determination of the timing information comprises setting the hop count to a minimum of a maximum hop count $l_{max}$ and one more than said lowest hop count of the one or more hop counts in the set of reliable timing information, and setting the reliability indicator to indicate that the broadcasted second synchronization signal is reliable, and the second synchronization signal is broadcasted based on the synchronization signal corresponding to the timing information that includes said lowest hop count of the one or more hop counts in the set of reliable timing information.

19. A non-transitory computer-readable medium storing computer-executable code, that when executed by a processor, cause the processor to:
receive a synchronization signal and timing information from each UE of a set of UEs;
determine a set of reliable timing information of the timing information received from the set of UEs that has a reliability indicator indicating that the received synchronization signal is reliable;
determine a lowest hop count of one or more hop counts in the set of reliable timing information when the set of reliable timing information is not an empty set;
determine timing information associated with a second synchronization signal to be transmitted, the timing information including a hop count and a reliability indicator associated with the synchronization signal, the reliability indicator being independent of the hop count and indicating one of reliable or unreliable; and broadcast the timing information with the second synchronization signal, wherein the reliability indicator included in the timing information is set by the UE to the one of reliable or unreliable, and wherein the hop count is set to a value l, where $1 \leq l \leq l_{max}$, $l_{max}$ being a maximum hop count, and wherein the reliability indicator is set to indicate that a previously broadcasted synchronization signal is reliable, wherein when the set of reliable timing information is not an empty set and said lowest hop count is less than l:
  the determination of the timing information comprises setting the hop count to one more than said lowest hop count and setting the reliability indicator to indicate that the broadcasted second synchronization signal is reliable, and
  the second synchronization signal is broadcasted based on the synchronization signal corresponding to the timing information that includes said lowest hop count.

20. A non-transitory computer-readable medium storing computer-executable code, that when executed by a processor, cause the processor to:
  determine a time at which a reliability indicator was initially set to an unreliable state;
  receive a synchronization signal and timing information from each UE of a set of UEs;
  determine a set of reliable timing information of the timing information received from the set of UEs that has a reliability indicator indicating that the received synchronization signal is reliable;
  determine a lowest hop count of one or more hop counts in the set of reliable timing information when the set of reliable timing information is not an empty set;
  determine timing information associated with a second synchronization signal to be transmitted, the timing information including a hop count and a reliability indicator associated with the synchronization signal, the reliability indicator being independent of the hop count and indicating one of reliable or unreliable;

broadcast the timing information with the second synchronization signal, wherein the reliability indicator included in the timing information is set by the UE to the one of reliable or unreliable, and wherein the hop count is set to a value l, where $1 \leq l \leq l_{max}$, $l_{max}$ being a maximum hop count, and wherein the reliability indicator is set to indicate that a previously broadcasted synchronization signal is unreliable, wherein when the set of reliable timing information is not an empty set and said lowest hop count is less than or equal to l:
  the determination of the timing information comprises setting the hop count to a minimum of a maximum hop count $l_{max}$ and one more than said lowest hop count and setting the reliability indicator to indicate that the broadcasted second synchronization signal is reliable, and
  the second synchronization signal is broadcasted based on the synchronization signal corresponding to the timing information that includes said lowest hop count;

wherein when the set of reliable timing information is an empty set or said lowest hop count is $1+\Delta$ when less than $\Delta$ times a threshold T consecutive synchronization iterations have passed since the determined time at which the reliability indicator was initially set to indicate an unreliable state, $\Delta$ being an integer greater than or equal to one, the determining the timing information comprises maintaining the hop count at l and setting the reliability indicator to indicate that the broadcasted second synchronization signal is unreliable.

* * * * *